(12) United States Patent
Fernandes et al.

(10) Patent No.: US 11,904,998 B2
(45) Date of Patent: Feb. 20, 2024

(54) VEHICLE STABILIZATION SYSTEM AND/OR METHOD

(71) Applicant: Space Perspective Inc., Kennedy Space Center, FL (US)

(72) Inventors: Royce Fernandes, Kennedy Space Center, FL (US); John Zaniel Maccagnano, Kennedy Space Center, FL (US); Taber MacCallum, Kennedy Space Center, FL (US); Ryon Warren, Kennedy Space Center, FL (US); Daniel James Window, Kennedy Space Center, FL (US); Rodger Farley, Kennedy Space Center, FL (US)

(73) Assignee: Space Perspective Inc., Kennedy Space Center, FL (US)

( * ) Notice: Subject to any disclaimer, the term of this patent is extended or adjusted under 35 U.S.C. 154(b) by 0 days.

(21) Appl. No.: 18/223,850

(22) Filed: Jul. 19, 2023

(65) Prior Publication Data
US 2024/0025529 A1    Jan. 25, 2024

Related U.S. Application Data

(60) Provisional application No. 63/422,851, filed on Nov. 4, 2022, provisional application No. 63/390,398, filed on Jul. 19, 2022.

(51) Int. Cl.
*B64B 1/42* (2006.01)

(52) U.S. Cl.
CPC ..................... *B64B 1/42* (2013.01)

(58) Field of Classification Search
CPC .............. B64B 1/42; B64G 1/625; B64G 1/62
See application file for complete search history.

(56) References Cited

U.S. PATENT DOCUMENTS

| | | | | |
|---|---|---|---|---|
| 3,079,113 A | * | 2/1963 | Meyer, Jr. ................ | B64G 1/62 244/158.9 |
| 3,606,212 A | * | 9/1971 | Paine ....................... | B64G 1/62 244/1 R |
| 5,318,256 A | * | 6/1994 | Appleberry .............. | B64G 1/62 244/158.9 |

(Continued)

FOREIGN PATENT DOCUMENTS

| | | | | |
|---|---|---|---|---|
| CN | 106542116 A | * | 3/2017 | ............... B64G 1/22 |
| DE | 4422617 C1 | * | 6/1995 | ............... B64D 1/14 |

(Continued)

OTHER PUBLICATIONS

"Splashdown test", Copenhagen Suboritals screenshot, https://copenhagensuborbitals.com/splashdown-test/, published Mar. 17, 2020.

*Primary Examiner* — Justin M Benedik
(74) *Attorney, Agent, or Firm* — Jeffrey Schox

(57) ABSTRACT

The system can include: a vehicle 100 and a stabilizer 200. However, the system can additionally or alternatively include any other suitable set of components. The system functions to facilitate vehicular transport (e.g., via a cabin). Additionally, the system can provide impact attenuation and/or mitigate rebound of the vehicle during a water landing. Additionally or alternatively, the system can function to provide aquatic stabilization of the vehicle and/or cabin thereof. However, the system 100 can provide any other suitable functionalities.

20 Claims, 13 Drawing Sheets

(56) References Cited

U.S. PATENT DOCUMENTS

| | | | | |
|---|---|---|---|---|
| 6,029,932 A * | 2/2000 | Wagner | ............... | B64C 25/00 244/100 A |
| 6,158,691 A * | 12/2000 | Menne | ............... | B64D 1/14 244/100 A |
| 11,565,833 B2 * | 1/2023 | Holemans | ............... | B64G 1/58 |
| 2006/0145020 A1 * | 7/2006 | Buehler | ............... | B64G 1/58 244/171.8 |
| 2008/0078883 A1 * | 4/2008 | de Jong | ............... | B64G 1/62 244/158.3 |
| 2012/0175465 A1 * | 7/2012 | Hudson | ............... | B64G 1/52 244/140 |
| 2013/0264413 A1 | 10/2013 | Aoki et al. | | |
| 2015/0344139 A1 * | 12/2015 | Coleman | ............... | B64D 17/80 244/113 |
| 2016/0264266 A1 * | 9/2016 | Stone | ............... | B64G 1/58 |
| 2019/0322495 A1 | 10/2019 | Prager | | |
| 2021/0371126 A1 | 12/2021 | Dennis et al. | | |

FOREIGN PATENT DOCUMENTS

| | | | | |
|---|---|---|---|---|
| EP | 1886920 A1 * | 2/2008 | ............. | B64G 1/222 |
| EP | 1905691 A1 * | 4/2008 | ............. | B64G 1/58 |
| JP | H0664594 A * | 3/1994 | | |

* cited by examiner

VEHICLE STABILIZATION SYSTEM AND/OR METHOD

CROSS REFERENCE TO RELATED APPLICATIONS

This application claims the benefit of U.S. Provisional Application No. 63/422,851, filed 4 Nov. 2022, and U.S. Provisional Application No. 63/390,398, filed 19 Jul. 2022, each of which is incorporated herein in its entirety by this reference.

TECHNICAL FIELD

This invention relates generally to the aerospace field, and more specifically to a new and useful vehicle stabilization system and/or method in the aerospace field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
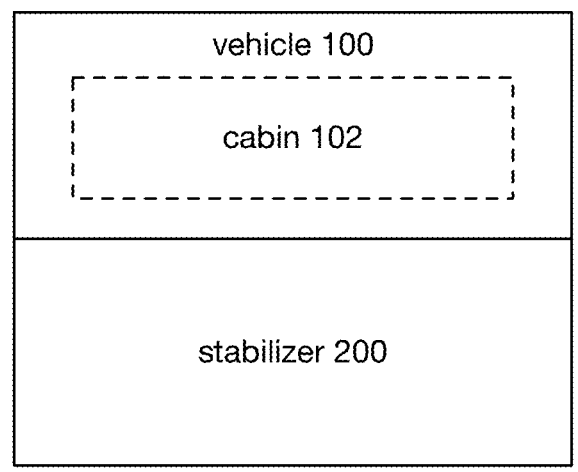
FIG. 1 is a schematic representation of a variant of the system.

The system, an example of which is shown in FIG. 1, can include: a vehicle 100 and a stabilizer 200. However, the system can additionally or alternatively include any other suitable set of components. The system functions to facilitate vehicular transport (e.g., via a cabin 110). Additionally, the system can provide impact attenuation and/or mitigate 'rebound' of the vehicle and/or cabin during a water landing. Additionally or alternatively, the system can function to provide aquatic stabilization of the vehicle 100 and/or cabin 110. However, the system 100 can provide any other suitable functionalities.

Figure 4A:
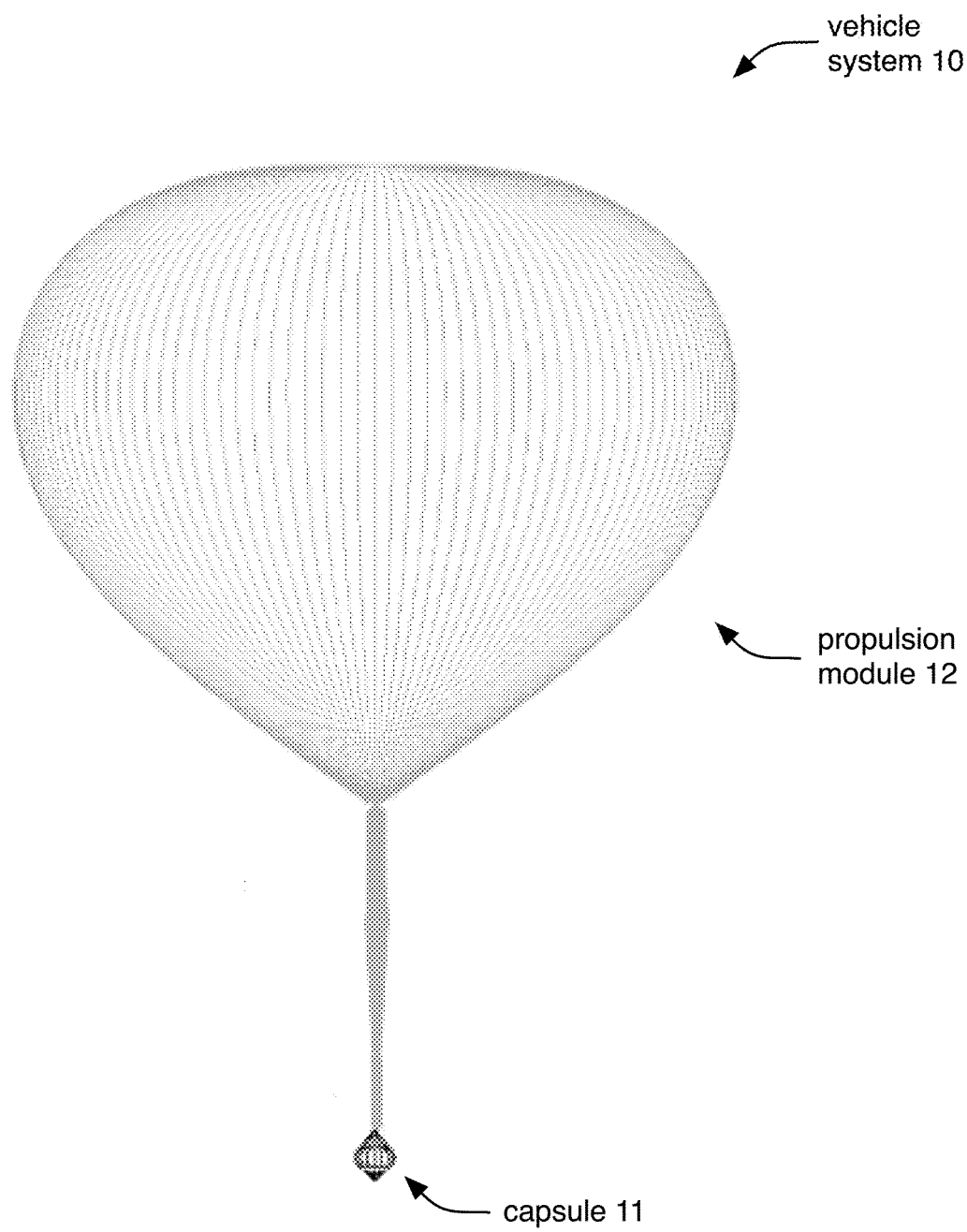
FIGS. 4A, 4B, and 4C are a first, second, and third schematic example, respectively, of a variant of the system.
Figure 4B:
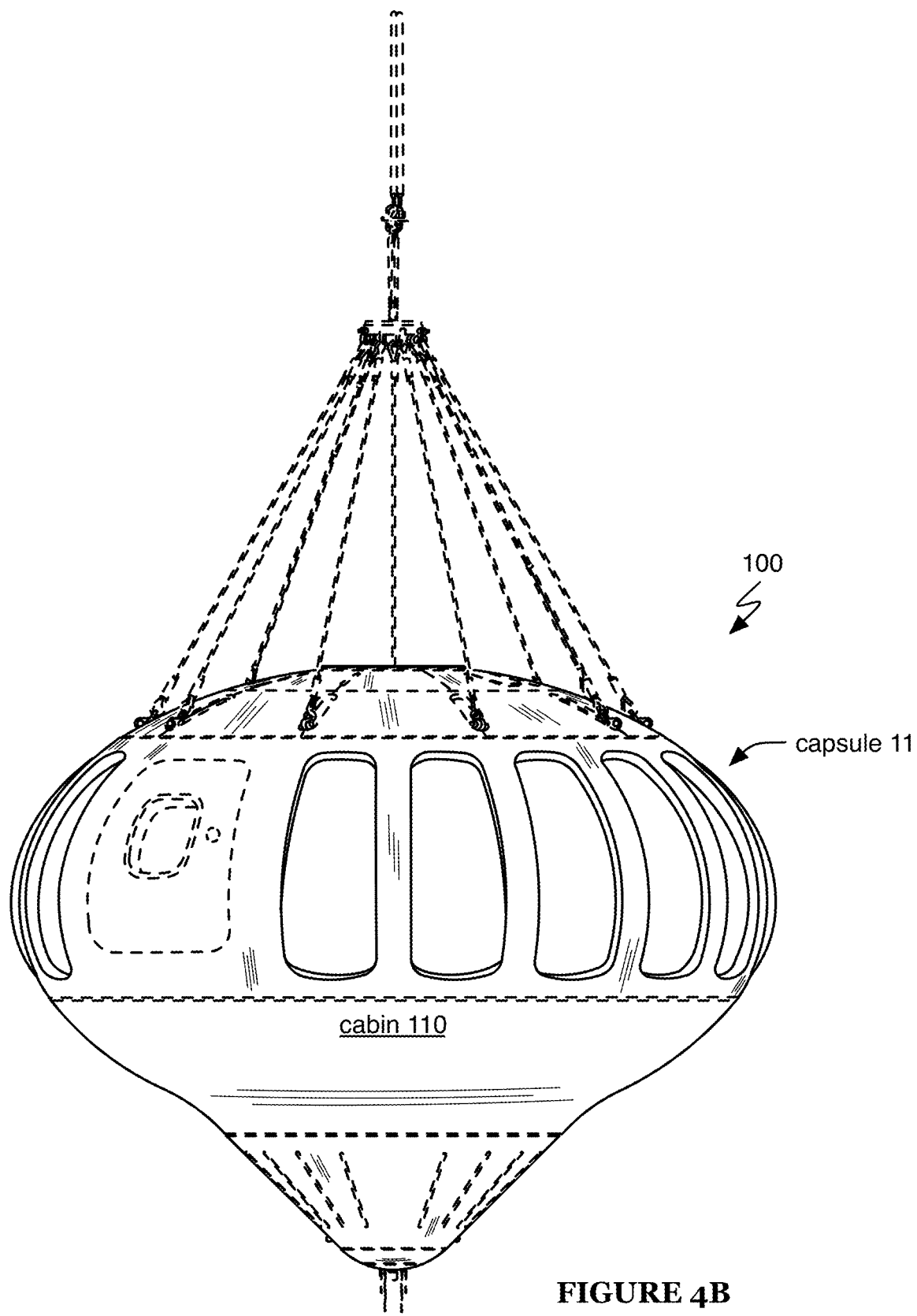
Figure 4C:
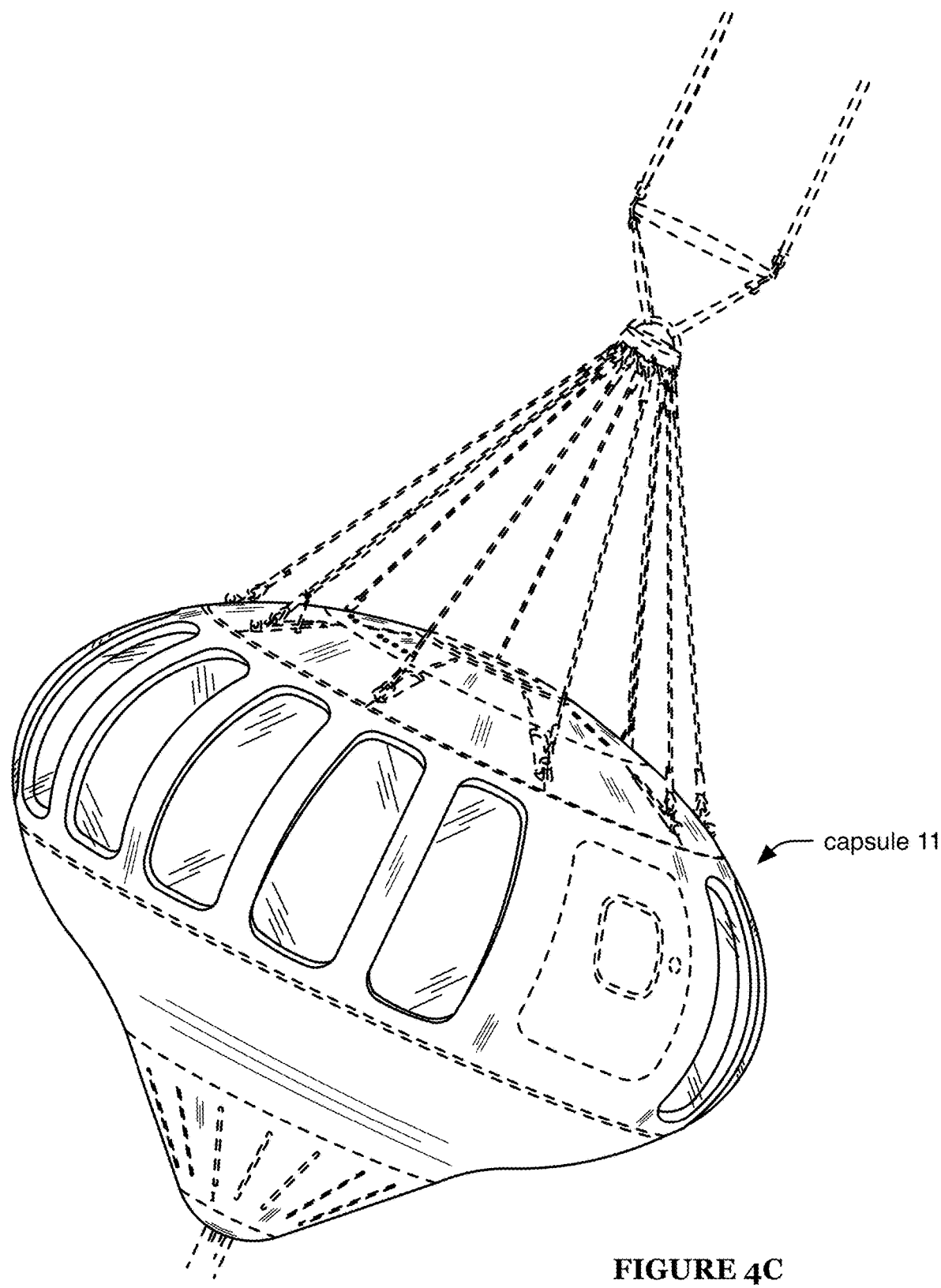

The system is preferably integrated with a vehicle system 10 (e.g., an aerial vehicle, such as a balloon vehicle) and/or other enclosure, more preferably a vehicle or enclosure configured to contain one or more living occupants, such as human occupants. For example, the system and/or method can be used with a pressure vessel capsule 11 (e.g., examples are shown in FIG. 4A, FIG. 4B, and FIG. 4C; where the cabin is integrated into the pressure vessel capsule 11; etc.) configured to transport human occupants to high altitudes (e.g., approximately 100,000 feet; via a propulsion module 12, an example of which is shown in FIG. 4A). However, the system 100 can include or operate in conjunction with any other suitable vehicle systems, and/or without separate vehicle or propulsion systems (e.g., when released for water landing; etc.).

In some variants, the system, method, vehicle (e.g., aerial vehicle, such as a balloon vehicle) and/or enclosure in which the system and/or method are integrated and/or employed, and/or any other suitable elements thereof can include one or more aspects such as described in U.S. patent application Ser. No. 17/160,837, filed 28-Jan.-2021 and titled "AEROSPACE VEHICLE SYSTEM AND METHOD OF OPERATION", U.S. patent application Ser. No. 17/162,151, filed 29 Jan. 2021 and titled "AEROSPACE BALLOON SYSTEM AND METHOD OF OPERATION", U.S. patent application Ser. No. 17/164,668, filed 1 Feb. 2021 and titled "AEROSPACE BALLOON SYSTEM AND METHOD OF OPERATION", and/or U.S. patent application Ser. No. 17/165,814, filed 2 Feb. 2021 and titled "AEROSPACE BALLOON SYSTEM, PARACHUTE, AND METHOD OF OPERATION", each of which is herein incorporated in its entirety by this reference. For example, the system can include a balloon and a capsule tethered to the balloon (e.g., at the top of the capsule, such as by a set of mounts at a superior surface of the capsule, etc.).

The term "substantially" as utilized herein can mean: exactly, approximately, within a predetermined threshold or tolerance, and/or have any other suitable meaning.

Figure 8:
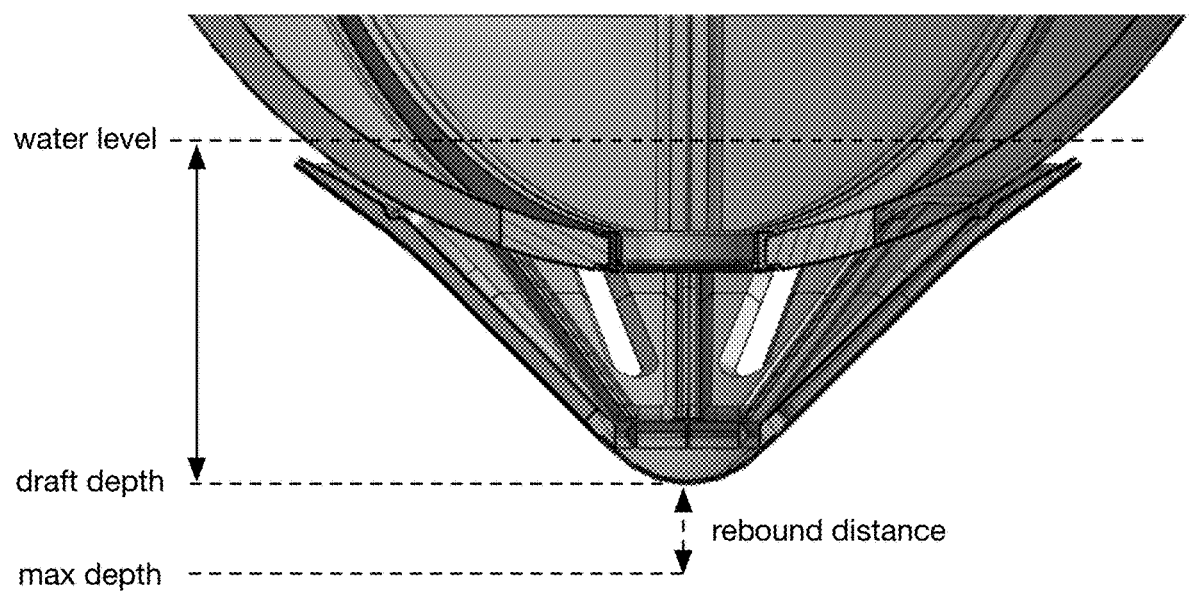
FIG. 8 is a diagrammatic example of a variant of the system.

The term 'rebound' or the equivalent term 'bounce-back' as utilized herein, in conjunction with vehicular water impacts or otherwise, can refer to a physical phenomenon which may result from a buoyant object (e.g., net density or net effective density less than that of water; configured to float in water on Earth at sea level) contacting the surface of a body of water while traveling with an initial positive velocity component in the direction of a weight vector (e.g., traveling downward). In such circumstances, the object may ingress the body of water (e.g., relative to the surface prior to contact; displacing the water to occupy a space previously occupied by the water; etc.) below an equilibrium depth of static stability (a.k.a., "draft" depth for the object; depth at which buoyancy force balances weight in a state of static equilibrium/stability), overshooting the equilibrium depth as a result of the initial kinetic energy of the object traveling (downward) with the initial velocity component (and potential energy of the object associated with height of the object above the draft depth), an example of which is shown in FIG. 8. The dynamics of this behavior may resemble that of an underdamped spring-mass system, where the buoyancy (buoyant force) on the object behaves like a spring (spring force) as a function of object depth, resulting in the object 'bouncing back' or 'rebounding' relative to the surface of the water upon initial contact. As an example, with a sufficiently large initial velocity, some objects (e.g., a basketball; etc.), may rebound with sufficient energy to launch away from the surface of the water. As a second example, other objects (e.g., buoys) may oscillate around the equilibrium draft depth, bobbing up and down repeatedly until friction/drag dampens the dynamic response (e.g., dissipating the initial kinetic and gravitational potential energy). In a third example, rebound effects may grow increasingly pronounced as objects (e.g., of similar geometry) increase in size (e.g., volume increases relative to surface area for increasingly large objects; as may be otherwise beneficial for increasing passenger/payload capacity and/or window viewing areas) and/or decrease in density (e.g., as may be otherwise advantageous for mass optimizations). However, the terms 'bounce-back' and/or 'rebound' may be otherwise suitably referenced herein, and/or may refer to any other suitable behaviors or physical phenomena.

2. Benefits.

Variations of the technology can afford several benefits and/or advantages.

First, variations of this technology can provide impact attenuation by reducing initial shock loads associated with vehicle deceleration. Such variants can utilize nadir structures, such as a stabilizer (e.g., conic, aerodynamic/hydrodynamic, etc.), to lengthen a duration of initial contact and/or a depth of water penetration during a water landing, which may reduce shock upon water impact. Variants can additionally allow water ingress into a nadir structure(s) during water landings, which may further increase the depth of initial water penetration (e.g., delaying and damping the dynamic effects of vehicle buoyancy). However, variants can otherwise provide impact attenuation.

Second, variations of this technology can mitigate the effects of vehicle rebound during a water landing by utilizing a stabilizer which allows water ingress (e.g., flooding) to increase resistance to rebound motions. For example, the stabilizer may increase hydrodynamic drag (e.g., particularly when flooded with water; acting as a sea-anchor) and/or may provide resistance to vertical motion (e.g., damping rebound effects). However, variants can otherwise mitigate the effects of vehicle rebound and/or otherwise facilitate water landings.

Third, variations of this technology can facilitate water landing, impact attenuation, and/or rebound mitigation under a variety of incidence angles and/or vehicle trajectories. For instance, when landing under prevailing winds, the vehicle may be angled relative to gravity and/or may have a nonzero horizontal velocity component. Some variants may facilitate angled and/or partially transverse landings by including a substantially rotationally symmetric (e.g., conic) stabilizer with a nadir cone angle between 60 and 100 degrees (e.g., 70 degree cone; 90 degree cone; etc.). In particular, low velocity landings, which may be otherwise desirable for impact mitigation, may be more sensitive to prevailing wind (e.g., where the wind speeds may exceed vertical speed of the descending vehicle), as the vehicle trajectory may. However, variants can otherwise facilitate water landings in various ambient conditions, and/or can be otherwise configured.

Fourth, variations of this technology can increase the stability of the vehicle and/or cabin when waterborne. For example, variants can stabilize the cabin with a primary (e.g., vertical) axis of the cabin aligned with a gravity vector and/or with a cabin standing platform (a.k.a., deck) substantially orthogonal to a gravity vector. In particular, this may improve experiences for cabin occupants when compared to vessels which stabilize by tipping to lay sideways (e.g., inhibiting the ability of users to stand or walk aboard the cabin when waterborne, which may not be well suited for vehicles with a degree of rotational symmetry). However, variants can otherwise provide cabin stability.

Fifth, variations can facilitate water landings of spacecraft or stratospheric aircraft with large (e.g., human-scale) viewing windows, which can offer superior, more immersive viewing opportunities and an improved trip experience for vehicle occupants. However, variants can facilitate water landings of any suitable vehicle systems, and/or may operate with any suitable vehicles.

However, variations of the technology can additionally or alternately provide any other suitable benefits and/or advantages.

3. System.

The system, an example of which is shown in FIG. 1, can include: a vehicle 100 and a stabilizer 200. However, the system 100 can additionally or alternatively include any other suitable set of components. The system functions to facilitate vehicular transport via a cabin. Additionally, the system can provide impact attenuation and/or mitigate rebound of the cabin during a water landing. Additionally or alternatively, the system can function to provide aquatic stabilization of the cabin. However, the system 100 can provide any other suitable functionalities.

3.1 Vehicle.

The vehicle 100 functions to facilitate vehicular transport via a cabin 102. Additionally or alternatively, the vehicle 100 can function to mount and/or structurally support the stabilizer 200. The vehicle is preferably an aerospace vehicle, such as the capsule of a lighter-than-air vehicle, but can additionally or alternatively be an aircraft, watercraft, spacecraft, cargo-vehicle, (manned) passenger vehicle, unmanned vehicle, and/or any other suitable vehicle. In variants, the vehicle can be the vehicle and/or capsule as described in U.S. patent application Ser. No. 17/160,837, filed 28 Jan. 2021 and titled "AEROSPACE VEHICLE SYSTEM AND METHOD OF OPERATION", U.S. patent application Ser. No. 17/162,151, filed 29 Jan. 2021 and titled "AEROSPACE BALLOON SYSTEM AND METHOD OF OPERATION", U.S. patent application Ser. No. 17/164,668, filed 01-Feb.-2021 and titled "AEROSPACE BALLOON SYSTEM AND METHOD OF OPERATION", and/or U.S. patent application Ser. No. 17/165,814, filed 02-Feb.-2021 and titled "AEROSPACE BALLOON SYSTEM, PARACHUTE, AND METHOD OF OPERATION", each of which is herein incorporated in its entirety by this reference.

The vehicle can be substantially rotationally symmetric (e.g., about a primary axis of the vehicle and/or stabilizer), but can additionally or alternatively be asymmetric, include asymmetric features (e.g., a hatch), and/or can be otherwise configured. The vehicle can include or define a vehicle platform (e.g., deck, mounting platform for the human supports, etc.), which is orthogonal to a primary (vertical) axis of the vehicle. As an example, the vehicle and/or stabilizer can be substantially rotationally symmetric about a primary axis which is oriented substantially vertically during vehicle traversal (e.g., absent wind effects; during ascent and/or landing; while the vehicle is waterborne; in all modes of operation; etc.). However, the vehicle can be otherwise configured.

The vehicle 100 can optionally include a cabin 102. The cabin can function to carry occupants (e.g., live occupants such as live humans) within the vehicle and to maintain conditions necessary for occupant health, safety, and/or comfort. The cabin is preferably arranged within the vehicle interior, such as within a pressure vessel interior (e.g., wherein the pressure vessel maintains a breathable atmosphere inside the pressure vessel interior, even in low-pressure environments unsuitable for sustaining human life). The cabin can include one or more human supports (e.g., seats). Each human support is preferably configured to orient a human occupant (e.g., the face and/or eyes of the occupant) toward a window of the pressure vessel (e.g., toward the window closest to the human support). For example, each human support can be arranged between the central axis and a window (preferably a different window for each human support). In this example, the human supports (e.g., seats) are preferably arranged facing the respective window with which they are aligned, but can additionally or alternatively have any other suitable arrangement. In a specific example, the cabin includes a set of seats arranged around the cabin (e.g., regularly spaced around the cabin). In this specific example, each seat is preferably arranged (e.g., mechanically secured to the capsule, such as to a floor of the cabin) near and facing toward a different window of the pressure vessel. In a second example, a floor/deck of the cabin is substantially orthogonal to a primary axis of the capsule, wherein a balloon can be tethered at an upper end of the capsule (e.g., at a set of mounts; at a superior surface of the capsule; an example is shown in FIG. 4C), opposite the stabilizer along the primary axis.

However, the human supports can additionally or alternatively have any other suitable functionality and/or arrangement, and/or the cabin can additionally or alternatively include any other suitable elements in any suitable arrangement.

3.2 Stabilizer.

Figure 2:
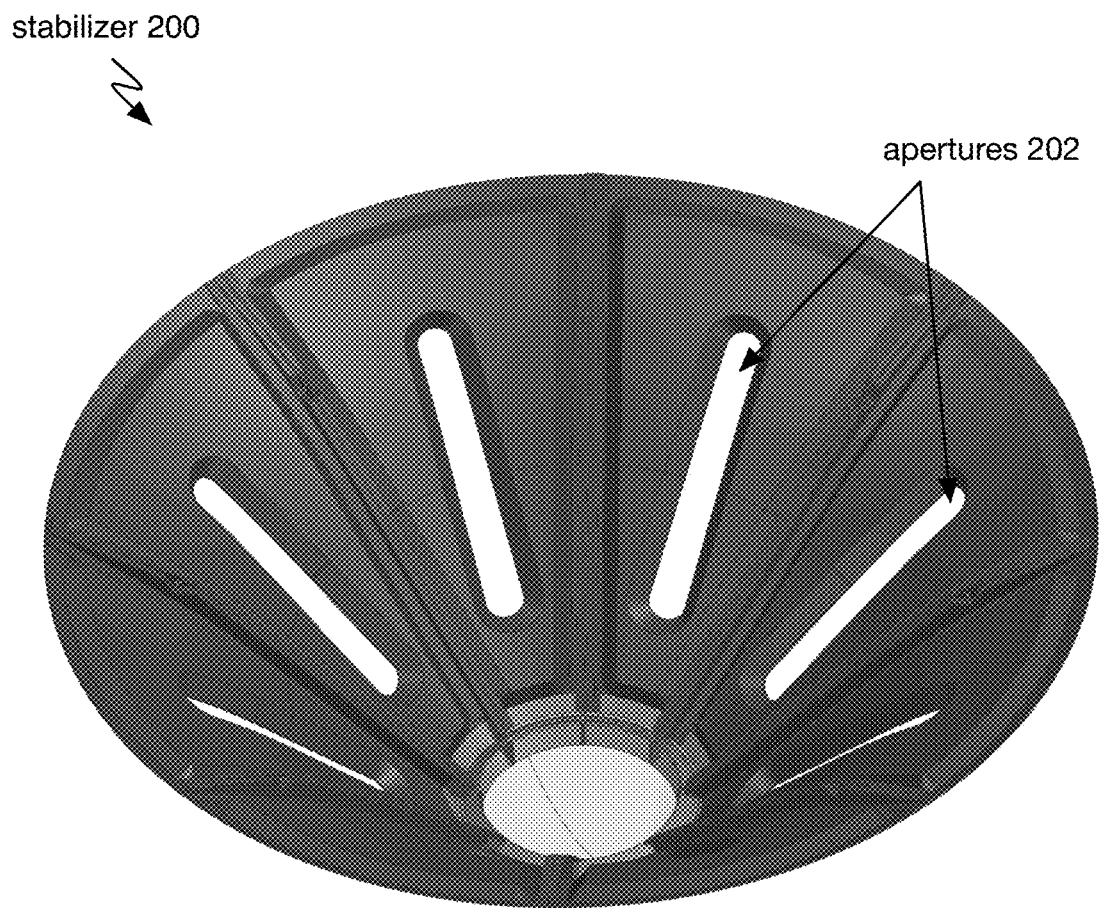
FIG. 2 is a trimetric view of a variant of a stabilizer.

The stabilizer, an example of which is shown in FIG. 2, functions to attenuate impacts and/or mitigate 'rebound' of the vehicle during water landings. Additionally, the stabilizer can function to provide aquatic stabilization of the vehicle 100 and/or cabin 110.

Figure 3A:
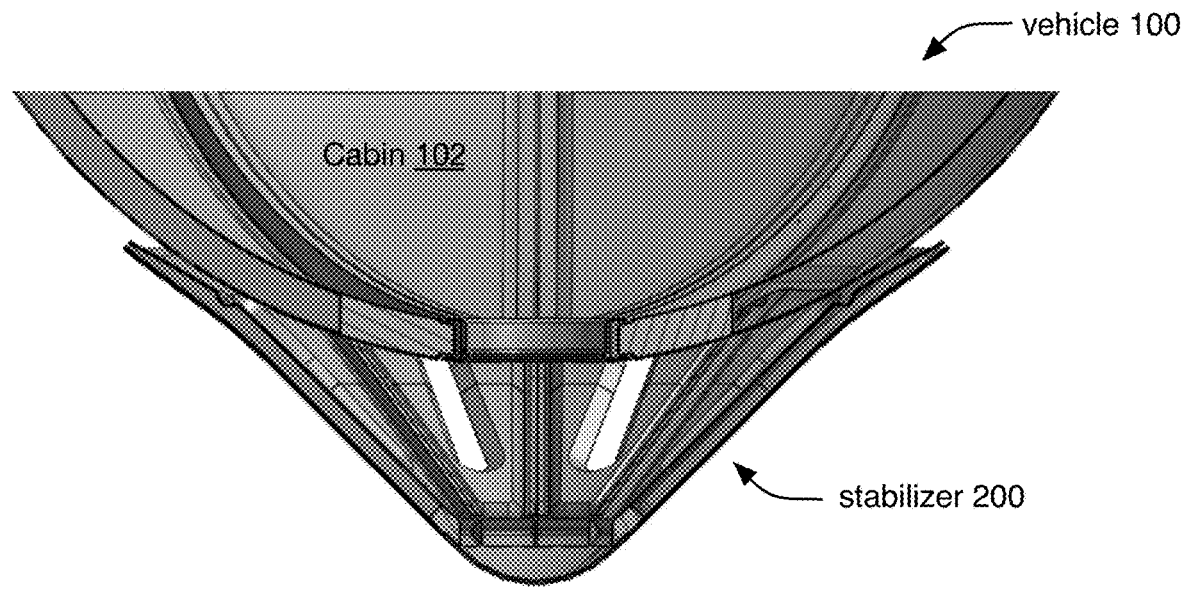
FIGS. 3A and 3B are a first and second side view cross-section of a variant of the system, respectively.
Figure 3B:
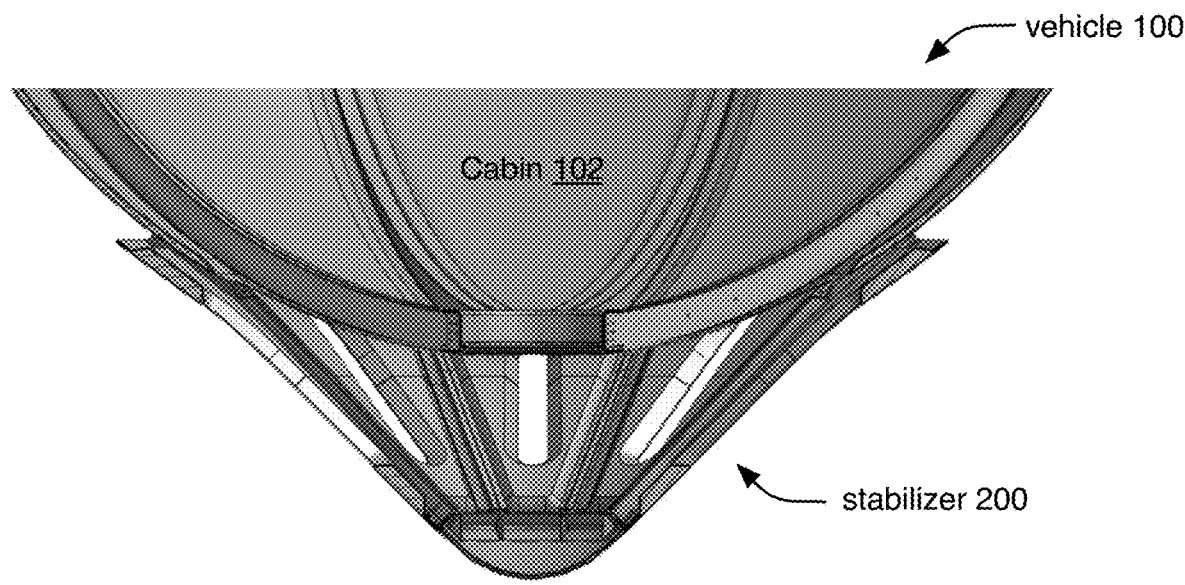
Figure 9:
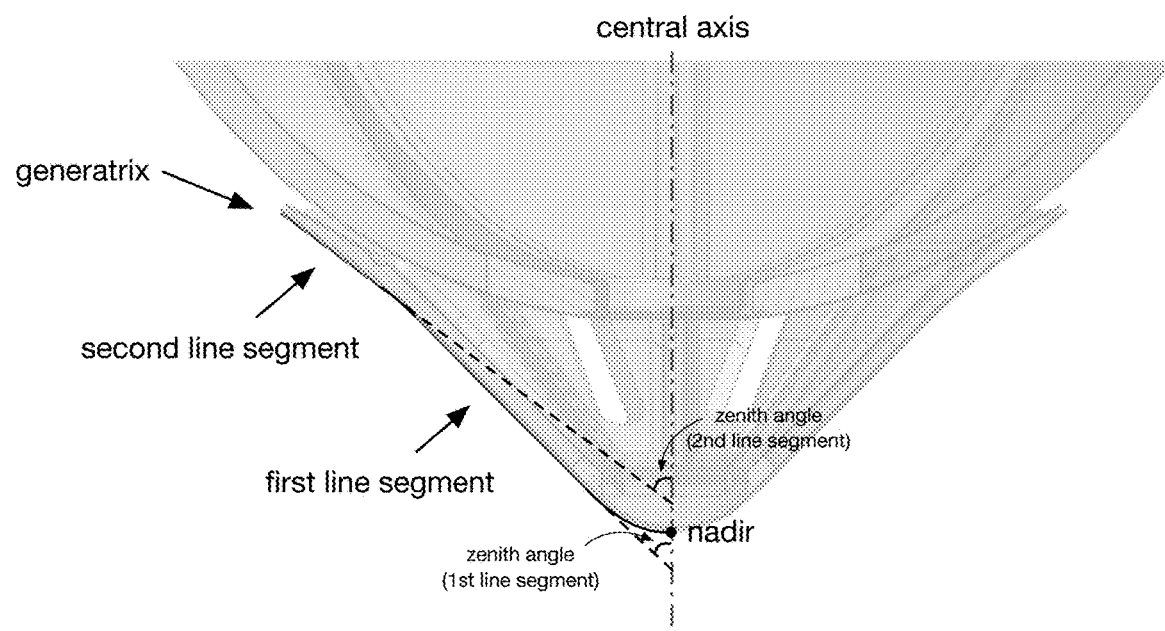
FIG. 9 is a diagrammatic example of a variant of the system.

The stabilizer can be conical (e.g., substantially conical, partially conical, pseudo-conical; truncated conical body, perforated/partial conical body, piecewise conical, etc.), hyperbolic, blunt (e.g., blunt body shaped; at a nadir end), aerodynamic/hydrodynamic, tapered (e.g., towards a nadir), and/or can have any other suitable geometry or include partial elements or surfaces of any of the aforementioned geometric constructions. In variants (e.g., examples are shown in FIGS. 3A and 3B), the stabilizer can include a body shape with a geometry defined as a solid of revolution and/or an inferior surface which is a surface of revolution about a central axis (e.g., vertical axis of the stabilizer). For example, an inferior surface of the stabilizer can be defined by revolving a path (generatrix) about a central axis (e.g., an example is shown in FIG. 9; revolving 360 degrees or less than 360 degrees, such as for a body panel or region between apertures, etc.), where an endpoint of the generatrix lies along the central axis (e.g., at a nadir of the stabilizer) and the generatrix includes: a line segment (e.g., having a zenith angle of about 30-50 degrees relative to the central axis, such as 30 degrees, 35 degrees, 45 degrees, etc.), a plurality of line segments (e.g., a first line segment, proximal to the nadir, with a zenith angle of about 35 degrees and a second line segment, distal from the nadir, with a zenith angle of about 45 degrees), a smooth path/curve (e.g., with no inflection points, with one inflection points, with more than one inflection point, etc.; defined by a function with a continuous first derivative), and/or any other suitable elements. In a second example, the stabilizer includes a cone-shaped inferior surface, rounded at the nadir. In a third example, the stabilizer includes a first conical surface smoothed with a second conical surface. In a fourth example, the stabilizer includes a blunt body (e.g., as may have advantageous aerodynamic properties for atmospheric re-entry in some variants of the system). In a fifth example, the stabilizer can be cone-shaped with the cone angle widening towards a base end of the cone (e.g., distal the nose end of the cone; distal the nadir end of the cone). However, the stabilizer can have any other suitable geometry/structure(s).

In one set of variants, the stabilizer can include and/or define: an inferior surface comprising a blunt nadir end and a truncated conical surface which is substantially radially symmetric about the primary axis.

The stabilizer is preferably narrower than the capsule and/or extends across only a partial fraction of the width of the vehicle capsule and/or cabin thereof (e.g., wherein a width of the capsule is larger than a maximum width of the stabilizer, such as evaluated at a maximum width of the capsule and/or largest cross section orthogonal to the primary axis; wherein the stabilizer is mounted below plane of the cabin with the largest cross section along the primary axis). For example, for substantially conical stabilizers, the maximum radius of the stabilizer about the central axis can be about half of the maximum radius of the vehicle capsule about the central axis. However, the stabilizer can be the same width as the vehicle capsule/cabin (e.g., spanning the full inferior surface of the capsule), larger than a width of the vehicle capsule (e.g., in a reference plane, such as at the lip/periphery of the capsule; wherein the lip is offset from the aerospace capsule), and/or can be otherwise configured.

In variants, the vehicle width can be larger than the vehicle height (e.g., including the stabilizer, excluding the stabilizer, etc.) and/or substantially similar to the vehicle height (e.g., width/height ratio of less than 0.5, 0.5, 0.75, 0.8, 0.9, 0.95, 1.0, 1.05, 1.1, 1.25, 1.5, 2, greater than 2, etc., with the height evaluated as the length along the primary axis), which may improve the stability upon impact and/or with the vehicle waterborne (e.g., to avoid tipping). Additionally, the (effective) center of mass of the vehicle (e.g., including water mass within the interior of the stabilizer) is preferably at or below the draft height of the vehicle, which may improve the inherent stability of the vessel. However, the stabilizer can be employed with any other suitable vehicle with any other suitable mass distribution and/or mass characteristics (e.g., which may vary based on cargo arrangements, for example).

The stabilizer can be connected/mounted to the vehicle by a set of mounts. The stabilizer is preferably mounted to an inferior surface and/or nadir portion of the vehicle with the mounts arranged within an interior of the stabilizer (e.g., between the cap and the periphery/lip), however the stabilizer can additionally or alternatively be externally mounted, mounted along a peripheral lip, mounted via the set of ribs, and/or otherwise mounted to the vehicle/capsule.

The stabilizer preferably includes and/or defines a set of apertures 202 which function to facilitate water ingress during a water landing and/or facilitate stabilization when the vehicle 100 is waterborne (e.g., upon landing). The apertures preferably extend through a thickness of the stabilizer and fluidly couple an interior of the stabilizer to an (ambient) exterior. For example, the vehicle and the stabilizer can collectively define a fluid interior, fluid reservoir, and/or fluid manifold which extends between a superior surface of the stabilizer and an inferior surface of the vehicle body (e.g., underside of a pressure vessel), wherein the apertures fluidly couple the fluid manifold to the ambient, fluid exterior through the thickness of the stabilizer (e.g., at an inferior surface/underside of the stabilizer). The fluid manifold/reservoir is preferably fluidly isolated from the cabin interior and/or a pressure vessel interior of the cabin, which can prevent water ingress into the cabin (e.g., as may be undesirable/unsuitable for the comfort of cabin occupants). As an example, and offset between the lip of conical stabilizer and the aerospace capsule defines at least one aperture at the lip, wherein the conical stabilizer defines a fluid manifold between the plurality of apertures through the thickness of the conical stabilizer and the at least one aperture at the lip. As a second example, the fluid manifold can fluidly couple each of the apertures of the plurality (e.g., between the stabilizer and an inferior surface of the vehicle capsule).

The set of apertures preferably includes a plurality of apertures, and can include: less than 4, 4, 6, 8, 10, 12, 24, greater than 24, any range bounded by the aforementioned values, and/or any other suitable number of apertures. However, the set of apertures can alternatively include a single aperture or define a unitary fluid manifold, and/or the set of apertures can include any other suitable number of apertures. Additionally or alternatively, in some variants, the system may altogether exclude apertures (e.g., where apertures may be selectively sealed-off in one or more configurations; etc.). However, the system can include any other suitable number of apertures.

Apertures preferably define an aperture area, which can be defined as: a area of relief relative to an inferior surface of the stabilizer; an area of a vertical projection of the aperture(s); an area of an orthogonal projection of the aperture(s) relative to the central axis; an area of relief along a reference surface defined by revolving a generatrix of the stabilizer body (e.g., such as an inferior boundary of a rib or body profile), about the central axis; and/or can be otherwise suitably defined. In variants, the aperture area can be: less than $0.25$ m$^2$, $0.25$ m$^2$, $0.5$ m$^2$, $1$ m$^2$, $2$ m$^2$, $3$ m$^2$, $5$ m$^2$, $10$ m$^2$, greater than $10$ m$^2$, any range bounded by the aforementioned values, and/or any other suitable aperture area. The aperture area, as a proportion of the inferior surface area and/or vertically projected area of the stabilize, can be: less than 1%, 1%, 2%, 3%, 5%, 7%, 10%, 12%, 15%, 20%, 25%, greater than 25%, any open or dosed range bounded by the aforementioned values, and/or any other suitable area proportional to the inferior surface area of the stabilizer. In an example, the plurality of apertures defines an aperture area between 2% and 10% of an area of an inferior surface area of the stabilizer (e.g., which may provide combined impact attenuation and rebound damping; which may avoid significantly overdamping and/or underdamping nominal landings). Additionally or alternatively, in some variants, the aperture area can be based on a combined-optimization of inferior surface area, structural strength, and/or water ingress resistance. For example, as the aperture area approaches zero, the resistance to water ingress may inhibit water ingress, resulting in less rebound mitigation and/or stability. Conversely, as the aperture area approaches an inferior surface area of the vehicle, the stabilization and impact attenuation advantages may be reduced, and/or structural loads requirements may disadvantageously increase the resulting mass of the system. Accordingly, in some examples, utilizing aperture sizes/area(s) within the aforementioned ranges may improve overall stabilizer performance in terms of stability, rebound mitigation, impact attenuation, and/or another functionality(ies).

The shape of apertures can be: round, rounded (e.g., slot or rectangle with rounded ends), circular, elliptical, slotted, polygonal (e.g., rectangular), arcuate (e.g., serpentine, arcuate edges, etc.), trapezoidal (e.g., convex trapezoid shape), annular, and/or apertures can have any other suitable shape or geometry. For example, the apertures can include a plurality of meridional slots.

Figure 10A:
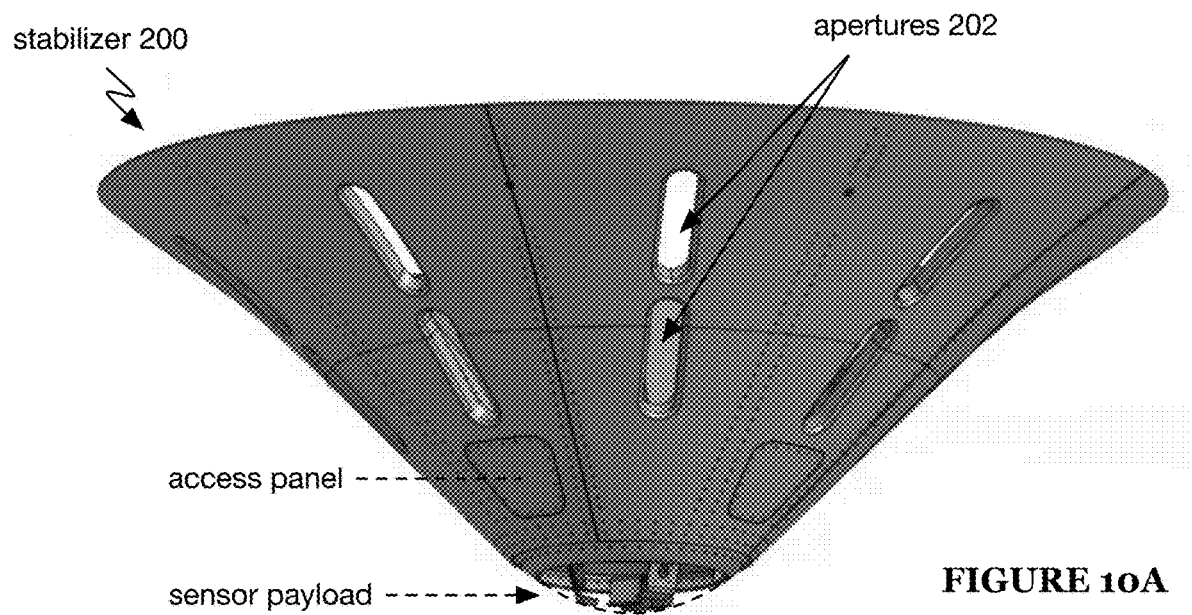
FIGS. 10A 10B are a first and second trimetric view and a variant of the stabilizer, respectively.
Figure 10B:
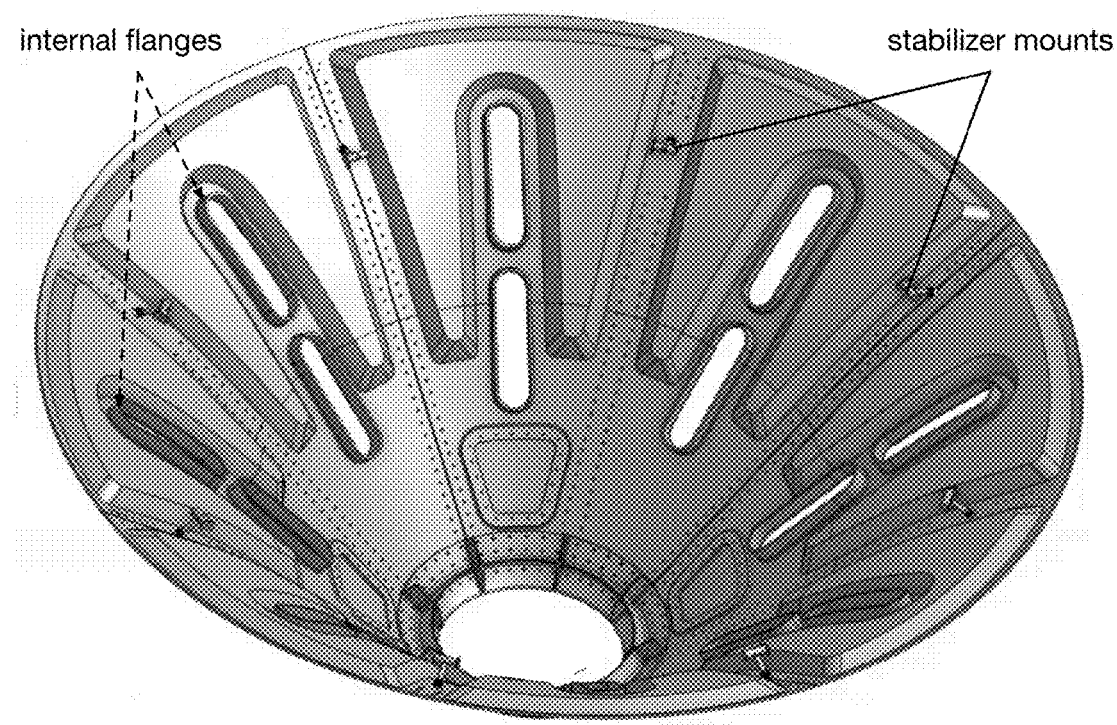

Apertures can be distributed symmetrically (e.g., rotationally symmetry about a central axis; mirror symmetry abound a midsagittal plane; etc.), asymmetrically, evenly spaced between support/mountings structure (e.g., ribs of the stabilizer and/or vehicle; mounting points; etc.; an example is shown in FIG. 10B), and/or can be otherwise arranged. Apertures are preferably distributed/arranged radially relative to the central axis and/or radiate outward relative to a nadir of the stabilizer (e.g., lowest point along the central axis; extending meridionally).

In variants, apertures can define a characteristic length relative to the generatrix of the inferior surface of the stabilizer and/or a line segment thereof (e.g., for a rotation of the generatrix centered along a maximum dimension of the aperture, etc.), which can be: less than $0.1$ m, $0.1$ m, $0.25$ m, $0.5$ m, $0.75$ m, $1$ m, $1.5$ m, $2$ m, $2.5$ m, $3$ m, $5$ m, greater than $5$ m, less than 10% of a generatrix path length, 25% of a generatrix path length, 40% of a generatrix path length, 50% of a generatrix path length, 60% of a generatrix path length, 70% of a generatrix path length, 80% of a generatrix path length, 90% of a generatrix path length, greater than 90% of a generatrix path length, any open or closed range bounded by the aforementioned values, and/or any other suitable characteristic length(s).

In variants, apertures preferably define closed geometries/regions (e.g., convex curve) along the surface of the stabilizer, but can additionally or alternatively define open geometries/regions, for which the stabilizer at least partially bounds the aperture. For example, the set of apertures can include one or more apertures at a periphery (a.k.a., lip) of the stabilizer. Apertures at the periphery of the stabilizer can be circular and/or annular (e.g., the vehicle exterior providing the radially inward aperture boundary and the stabilizer defining the radially outward aperture boundary; fully circumferential about the vehicle and/or primary axis) or may be partially circumferential about the vehicle (e.g., where an open curve or set of edges of the stabilizer abuts the vehicle exterior, cooperatively defining a dosed geometric region. Additionally or alternatively, apertures may extend up to the periphery of the stabilizer.

In a first example, each of a plurality of apertures extend through a thickness of the stabilizer. In the first example, the stabilizer can be mounted with the peripheral edge offset from the vehicle to define a circumferential aperture (between the stabilizer and the vehicle) along the peripheral edge, wherein the set of apertures includes the plurality of apertures and the circumferential aperture.

In a second example, a plurality of apertures radiate outwards relative to a nadir end of the stabilizer and extend to a periphery of the stabilizer (e.g., in a radial cross section, the apertures are radially offset from the stabilizer by a first portion of the stabilizer generatrix and span a remainder of the stabilizer generatrix; meridionally).

In a third example, the set of apertures can include a first set of apertures and a second set of apertures, wherein the first set of apertures are arranged radially inward of the second set of apertures relative to the central axis.

However, the stabilizer can include any other suitable set of apertures.

The stabilizer is preferably rigidly mounted to the vehicle via a set of fasteners (e.g., pin clevis, threaded fasteners, etc.), but can additionally or alternatively be integrated into the structure of the vehicle (e.g., welded, bonded, body elements commonly fabricated in a composite layup, etc.), removably mounted to the vehicle (e.g., via mechanical fasteners), semi-rigidly mounted to the vehicle (e.g., via flexible/movable tethers), deformably mounted to the vehicle (e.g., via a suspension system; via an elastically and/or plastically deformable impact attenuator; etc.), and/or can be otherwise mounted to the vehicle. The stabilizer is preferably mounted below the vehicle and/or at an inferior end of the vehicle along a primary/vertical axis, with the stabilizer arranged beneath the nadir end of the vehicle (e.g., below a nadir of the vehicle body and/or cabin). In an example, the stabilizer can reduce structural (pressure) loads on impact and direct impact loads away from the skin of the vehicle (e.g., on the inferior surface; directing loads to the frame).

As an example, when deployed as part of an aerospace balloon vehicle, the stabilizer can be mounted to the vehicle capsule prior to launch (e.g., during balloon inflation, on the deck of a ship, prior to a launch from a dry launch system, etc.) and can be removed from the capsule upon retrieval (e.g., which may facilitate servicing, cleaning, drainage, drying, salt removal, etc.).

In variants, the stabilizer can be mounted with the upper and/or peripheral edge of the stabilizer at least partially offset from the vehicle exterior to form a set of peripheral apertures. As an example, peripheral apertures may be advantageous during initial water ingress to facilitate displaced air venting/egress, which may avoid excess air compression/pressurization within the interior of the stabilizer from restricting or inhibiting water inflow in some circumstances (e.g., an example of air venting during landing is shown in FIG. 7B). Additionally or alternatively, the peripheral edge can increase hydrodynamic drag (e.g., resisting rebound motions; acting as a sea-anchor; scooping water through the stabilizer during upward and/or lateral velocity/motion; etc.). Additionally or alternatively, air venting, air egress, and/or air depressurization can occur through the vehicle body, through the thickness of the stabilizer (e.g., via a set of vents), and/or through any other suitable passive or active air venting/depressurization mechanism(s). Alternatively, the stabilizer can be mounted in circumferential abutment with the vehicle body (e.g., forming a closed edge which encircles the primary axis), and/or the stabilizer can be otherwise mounted.

The stabilizer is preferably a composite structure (e.g., carbon fiber), such as formed (e.g., via layup) from a matrix material (e.g., polyester, epoxy resins) and a reinforcing material (e.g., glass mat, woven fabric, etc.), but can additionally or alternatively include metal/alloyed reinforcing structures (e.g., ribs, support rings, flanges and/or reinforcement elements, etc.; steel alloy, aluminum alloy, titanium alloy, etc.), high thermal conductivity materials (e.g., copper, thermal interface materials, integrated heat sink, high thermal conductivity materials, etc.), high temperature materials (e.g., heat shielding), and/or any other suitable materials/structures. The stabilizer is preferably a unitary body (e.g., formed, bonded, fastener assembly, etc.; pre-preg and/or laminated composite layup over a foam core), but can additionally include multiple bodies which are configured to be separately mounted/retained relative to the vehicle (e.g., set of independently-mounted body panels/wedges, etc.), and/or can be otherwise constructed.

Figure 5:
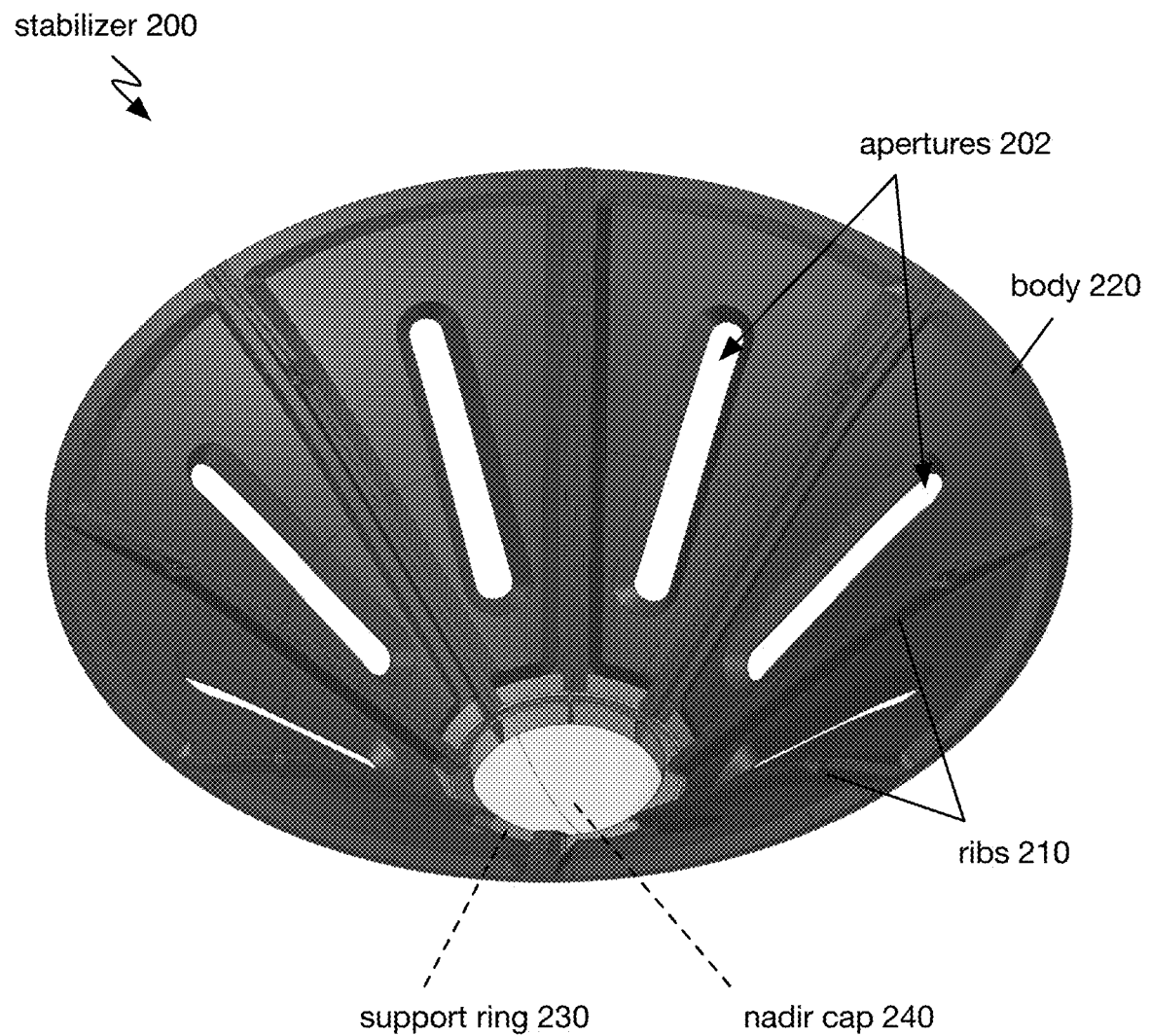
FIG. 5 is a diagrammatic example of a variant of a stabilizer.

In a first set of variants, an example of which is shown in FIG. 5, the stabilizer 200 can include: a set of ribs 210, a body 220, an optional support ring 230, an optional nadir cap 240, and/or any other suitable set of components.

The ribs 210 can function to mount the stabilizer to the vehicle and/or structurally reinforce the body 220, transmitting structural loads between the body and the vehicle (e.g., vehicle frame and/or ribs thereof). The ribs are preferably metal (e.g., aluminum alloy), formed with a superior surface in the shape of the generatrix of the stabilizer. Each rib is preferably configured to mount to a corresponding rib of the vehicle (e.g., with 1:1 correspondence and/or alignment), however the ribs can be otherwise configured. The ribs are preferably uniformly distributed about the central axis (e.g., uniform radial spacing; meridional ribs) and/or are substantially symmetric about the central axis. However, the stabilizer can include any other suitable set of ribs, the ribs can be integrated into the structure of the vehicle (or vehicle frame), and/or the stabilizer can be otherwise constructed.

The body 220 preferably functions to form the geometric surfaces of the stabilizer which can achieve various fluid dynamic effects (e.g., stability, impact attenuation, rebound mitigation, etc.). Additionally or alternatively, the body functions to form and/or define the apertures 202. The body is preferably composite, but can additionally or alternatively be formed from aluminum and/or any other suitable materials. The body can be unitary, can include a plurality of separate elements (e.g., connected to one another, connected via the ribs and/or any other suitable supporting/connective structures of the stabilizer; separately connected to the vehicle; meridional, 'wedge-shaped' panels spanning between adjacent ribs and/or sets of multiple ribs, etc.), and/or can be otherwise configured. In a specific example, the body 220 is cone-shaped about a primary axis of the stabilizer. However, the stabilizer can include any other suitable body(ies) defining any other suitable aperture(s).

The stabilizer can optionally include a support ring 230 which functions to connect the ribs and/or body (panels) proximal to a nadir end. For example, the support ring can be a metal structure (e.g., aluminum alloy) configured to transmit forces/moments between the ribs. As an example, a support ring may be structurally advantageous, particularly in various off-nominal load cases (e.g., where the primary/central axis is skewed relative to a gravity vector, such as may occur when landing under prevailing wind). As a second example, a support ring may be advantageous to facilitate the use of a nadir cap which is separately fabricated from the body (e.g., separate layups; simplifying tooling; etc.). However, the stabilizer can include any other suitable support ring, a support ring and nadir cap can be integrated into a single structure or assembly, and/or the system can otherwise altogether exclude a support ring(s).

Figure 11:
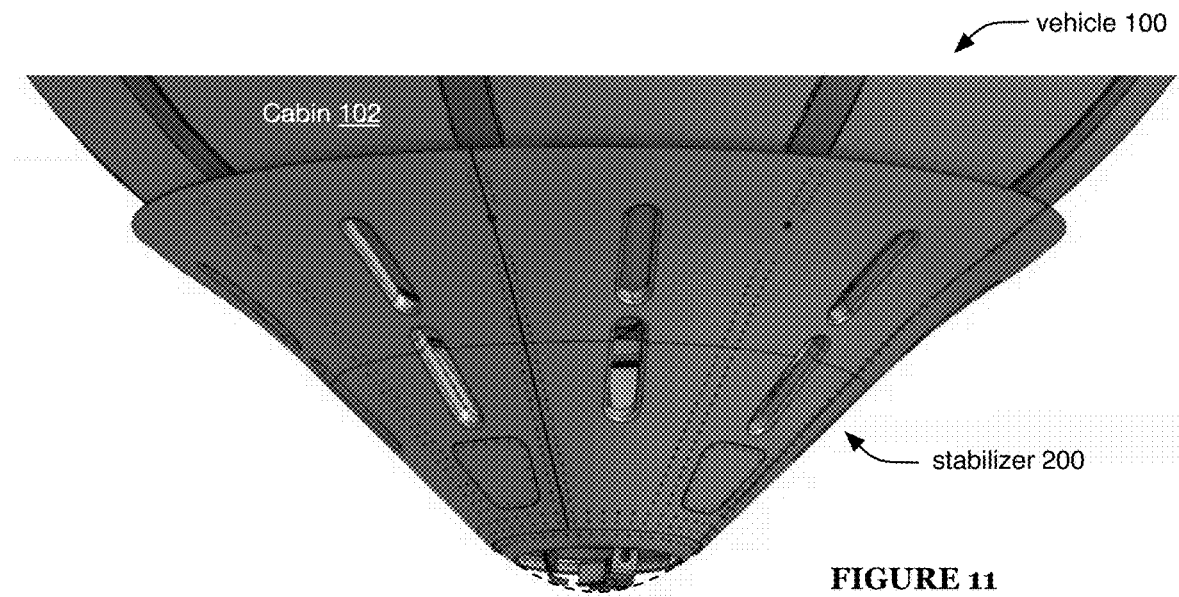
FIG. 11 is a partial 3D view of and a variant of the system.

Additionally or alternatively, the stabilizer can include any other suitable reinforcing structures/elements. In particular, apertures and/or material relief within the body of the stabilizer may reduce the stiffness of the stabilizer, which may result in excess deformation and/or material yield under some load cases. The structural influence of the apertures may generally grow increasingly pronounced as the size (e.g., individual area, total combined area, meridional length, etc.) increases. Accordingly, some variants can include integrated flanges (e.g., internal flanges, external flanges, etc.) and/or circumferential/peripheral reinforcement to stiffen the stabilizer and/or body thereof along the apertures (e.g., flange within a layup or unibody composite, etc.). For example, flanges may reduce stress concentrations along the edges of the apertures and/or increase the stiffness along aperture edges. Additionally or alternatively, variants can incorporate multiple smaller aperture arrays (e.g., series of apertures along a meridional line; array of multiple smaller apertures within a body panel, etc.; an example is shown in FIGS. 10A-10B; an example is shown in FIG. 11) in place of a single aperture, which may improve the relative strength and/or stiffness of the stabilizer (e.g., as a function of the aperture area and/or total relief area, etc.).

The stabilizer can optionally include a nadir cap 240 which functions to form the geometric surfaces of the stabilizer (in conjunction with the body). In particular, where the body forms a portion of the inferior surface geometry of the stabilizer, the nadir cap can form a remainder of the inferior surface geometry (e.g., closing out the nadir end). Additionally or alternatively, the nadir cap can provide an additional structure (e.g., separate from the body) at a point of impact (e.g., nadir and/or adjacent structure), which may allow for additional reinforcement and/or modularity. In a specific example, the nadir cap can include a dome structure at the nadir. The nadir cap is preferably fabricated separately from the body 220, by the same manufacturing process/materials, but can alternatively be fabricated with different materials and/or via a different manufacturing process. The nadir cap can be integrated with the body (e.g., bonded, etc.) and/or separately mounted to the ribs 230 and/or support ring 240. However, the stabilizer can include any other suitable nadir cap, the nadir cap can be formed/integrated with the body of the stabilizer, or the stabilizer can altogether exclude a stabilizer cap.

However, the system can include any other suitable stabilizer.

In some variants, the stabilizer can be removable and/or separate from the vehicle in one or more configurations, and/or can be otherwise deployed in any other suitable contexts.

In some variants, the system can include a single (unitary) stabilizer, or a plurality of stabilizers (or stabilizer elements). For example, the system can include a single cone-shaped stabilizer, a cone-shaped stabilizer including multiple separate (and/or separately-mounted) elements, and/or a plurality of cone-shaped stabilizers (e.g., each extending along a respective axis of a vehicle, such as along the axis of each of a plurality of legs, floats/pontoons, pylons, etc.).

In some variants, the stabilizer can optionally include access panels (e.g., an example is shown in FIG. 11) and/or a removable cap, which can function to facilitate cleaning and/or drainage of the stabilizer. In particular, seawater landings may result in salt deposition and/or seawater collection within the stabilizer interior, which may be washed down/cleaned after landing (e.g., with or without removal of the stabilizer; on the deck of a launch vessel, etc.; where salt buildup may be corrosive and/or otherwise negatively impact vehicle longevity). Additionally, variants can optionally include additional orifices (e.g., at the cap section) to facilitate drainage, and/or may otherwise manage fluid collection/rejection below the apertures.

Figure 12A:
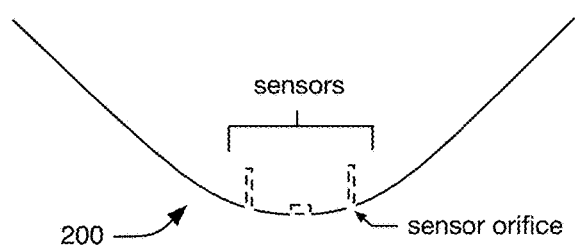
FIGS. 12A-12B are a first and second example of a stabilizer, respectively.
Figure 12B:
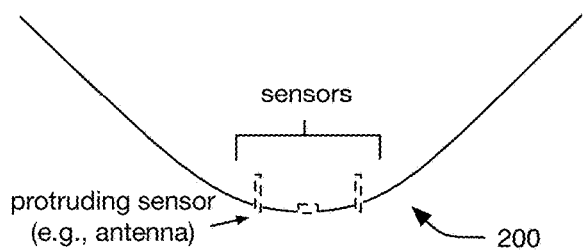

Additionally, variants can optionally include sensor mounts and/or support a sensor payload within the stabilizer interior. For example, vehicle sensors, antennas (e.g., GPS, cellular bluetooth, etc.), cameras (e.g., oriented towards Earth; nadir camera;), localization sensors, LIDAR, Radar, sonar, and/or any other suitable sensor(s) can be mounted to and/or integrated with the stabilizer and communicatively coupled to the vehicle. Sensors can be mounted internally (e.g., within the interior of the stabilizer, such as within the domed portion of the cap), entirely enclosed within the stabilizer, optically connected to a vehicle exterior through a thickness of the stabilizer (e.g., by an integrated lens), extend through a thickness of the stabilizer (e.g., an example is shown in FIG. 12B), substantially aligned with an orifice/cavity of the stabilizer (e.g., at a cap portion, an example is shown in FIG. 12A; which may facilitate seawater drainage when dry docked, supported onboard a launch vessel, airborne, etc.), and/or otherwise packaged within the stabilizer. However, the stabilizer can alternatively exclude sensors, sensor payloads can be selectively mounted and/or removed, and/or the system can be otherwise configured.

In one example, seawater can be drained via sensor orifices, removal of a cap (e.g., at the nadir end and/or domed portion), and/or a set of access panels. Alternatively, seawater can be otherwise evacuated and/or the vehicle can be otherwise configured.

In one example, a downward facing (external) camera at a nadir end of the stabilizer may facilitate viewing/imaging of a landing site/region (or water impact area) prior to impact, which may facilitate vehicle navigation and/or collision avoidance in some circumstances.

However, the system can include any other suitable components.

4. Variants

Figure 7A:
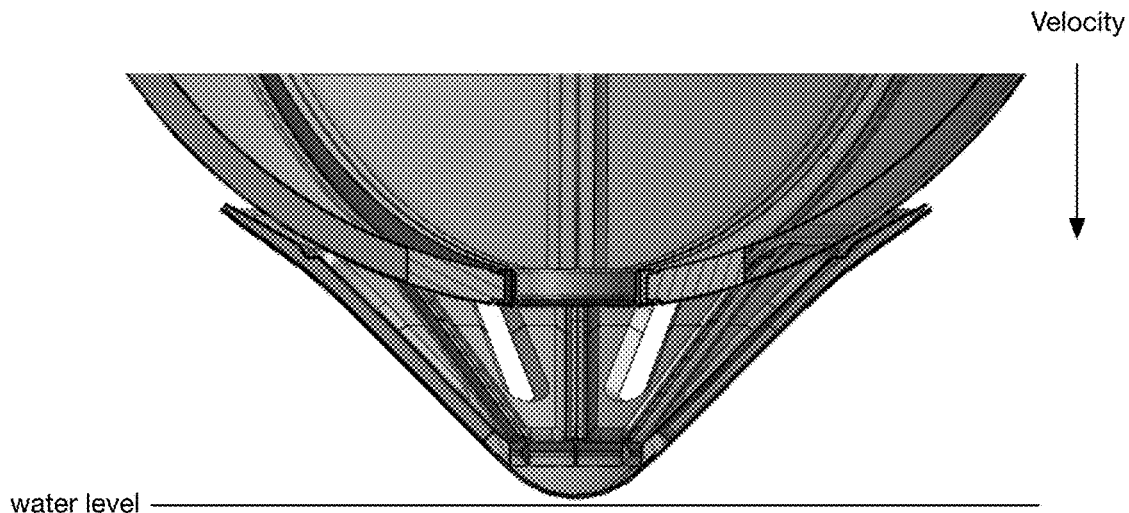
FIGS. 7A-7D are diagrammatic representations of a variant of the system in various stages of a water landing.
Figure 7B:
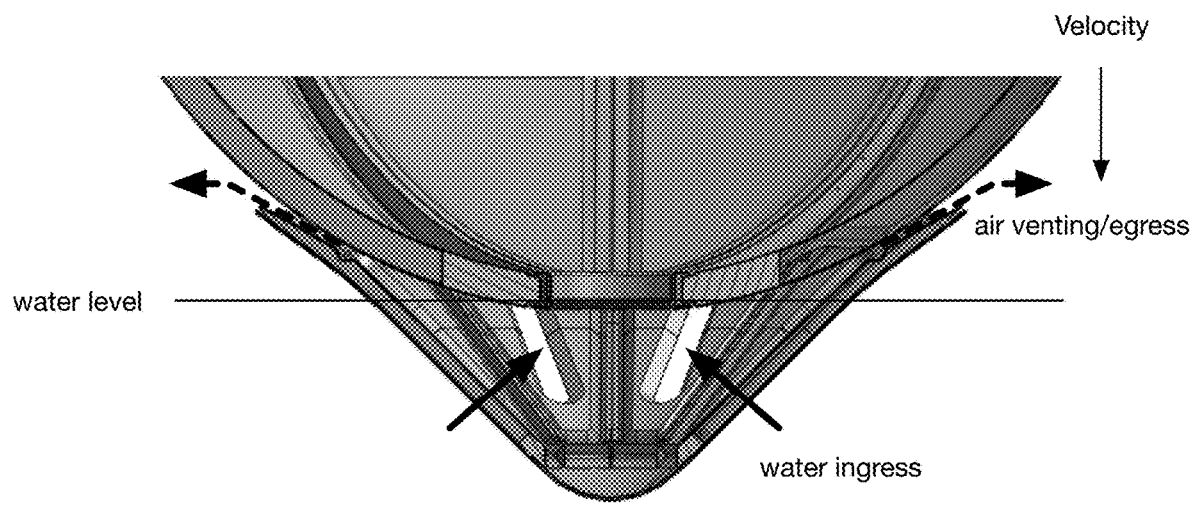
Figure 7C:
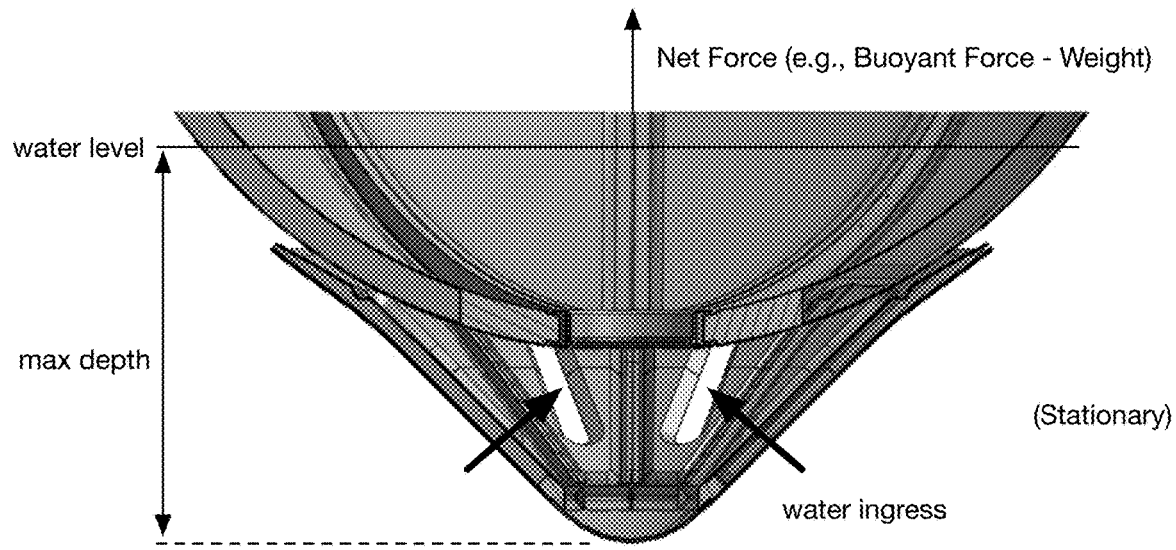
Figure 7D:
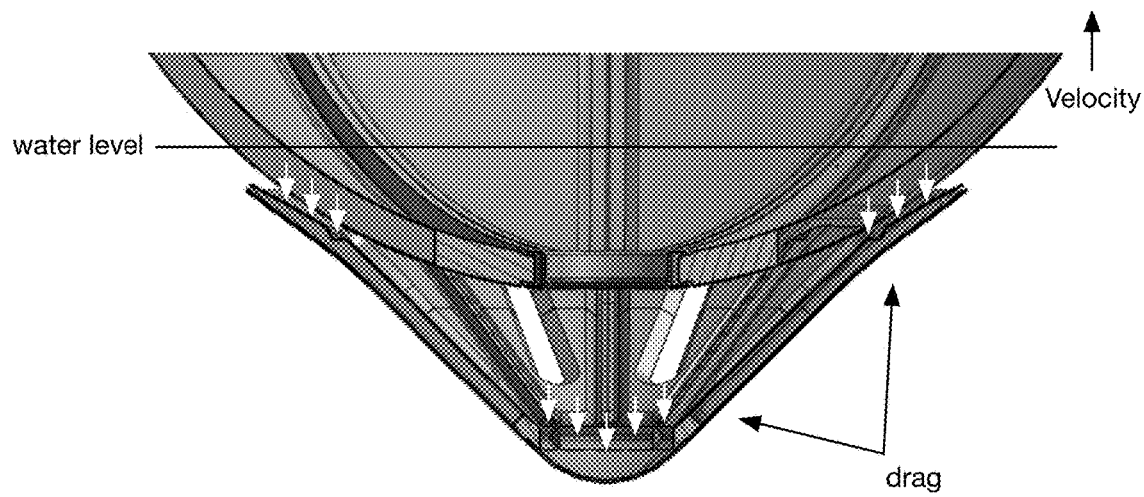

In one variant of a water landing, the vehicle/system can approach the water with an initial (entry) velocity prior to water impact (e.g., an example is shown in FIG. 7A). As the vehicle penetrates the surface of the water, the vehicle water ingresses the stabilizer and the vehicle decelerates (e.g., an example is shown in FIG. 7B), reducing the downward velocity until the vehicle slows to a halt (e.g., stationary; vertical velocity component is zero) at some maximum depth (e.g., an example is shown in FIG. 7C; below a draft depth, an example of which is shown in FIG. 8; etc.), where the net upward force on the vehicle/system is large (e.g., maximum buoyant force upwards). The vehicle/system then accelerates upwards due to the resulting net upward (buoyant) force, while the water within the stabilizer creates a counteracting hydrodynamic drag (e.g., reducing the upward acceleration; damping the 'spring-like' buoyancy response; an example is shown in FIG. 7D; etc.). Additionally, hydrodynamic drag from the stabilizer can dampen 'spring-like' buoyancy responses to perturbations of the system about the draft depth (e.g., while the vehicle is water-borne; as a result of waves, wind effects, etc.), stabilizing the vehicle/system at the draft depth.

Figure 6:
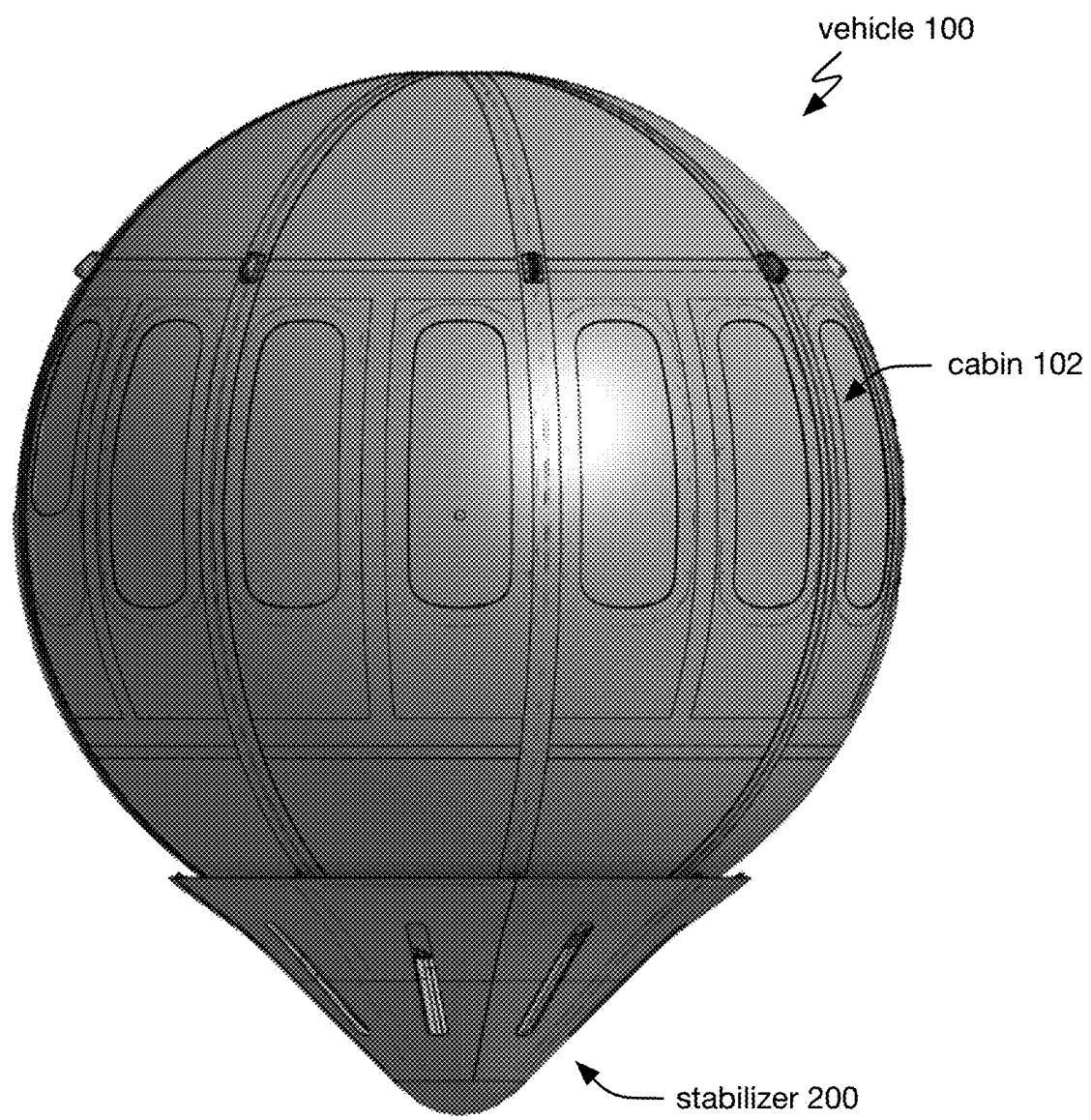
FIG. 6 is a schematic representation of a variant of the system.

In some embodiments, the vehicle includes a cabin (e.g., configured to contain occupants and/or cargo) and a stabilizer (e.g., as shown in FIG. 1 and FIG. 6), such as structure protruding from the vehicle (e.g., arranged at or near a nadir of the vehicle). The structure can be a conical or pseudo-conical structure (e.g., as shown in FIGS. 2 and/or 3A-3B), or can be any other suitable structure.

In variants, the stabilizer preferably functions to provide stability to the vehicle after and/or during a water landing. For example, the stabilizer can define an internal chamber open to the surrounding environment (and/or operable to be opened to the surrounding environment) via one or more apertures (e.g., as shown in FIGS. 3A-3B), which can allow water to enter the chamber during and/or after a water landing (e.g., as shown in FIGS. 7A-7D). The water entering the internal chamber can function to move the vehicle's center of gravity downward, thereby increasing vehicle stability as it floats in the water. In some examples, rapid flooding of the internal chamber during water landing may be preferable, as in the absence of flooding (or with only partial flooding after a threshold time), buoyancy provided by the internal chamber could cause the vehicle to capsize (e.g., tip to the side, such that the internal chamber is not submerged or substantially not submerged; turn turtle, such that the nadir of the vehicle points substantially upward, etc.) or yield steep roll angles relative to the cabin deck. Additionally or alternatively, the stabilizer (e.g., after flooding of the internal chamber) can optionally function as a damping water drag device, thereby reducing the roll and/or pitch of the vehicle in the water. In some variants, the aerospace capsule and the conical stabilizer cooperatively define a draft depth (e.g., relative to water and/or sea water, for a given cargo load), wherein the conical stabilizer is configured to attenuate water impacts by: penetrating ambient water below the draft depth; and damping oscillation about the draft depth via hydrodynamic drag.

Additionally or alternatively, the stabilizer can optionally function to provide mechanical assistance during vehicle landing, such as water landing. In some examples, the stabilizer can function to prolong (e.g., as compared with a vehicle with no stabilizer and an otherwise similar structure) the deceleration time when the vehicle enters the water upon landing (e.g., wherein part or all of the vehicle becomes submerged in the water upon landing), thereby decreasing the peak deceleration experienced by the vehicle/capsule during such a landing (e.g., decreasing landing shock and shock loads). Additionally or alternatively, the stabilizer can function to deflect the peak water loads from the lower part of the cabin exterior.

In some variants, the stabilizer can additionally or alternatively operate as a sea-anchor (e.g., substantially rigid and/or non-deformable sea-anchor, with fixed geometry) when submerged/flooded.

In some variants, the stabilizer can be a flooding splash cone.

However, the aerospace vehicle and/or method of use can additionally or alternatively include any other suitable elements and/or have any other suitable functionality.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A vehicle system comprising:
a balloon;
a capsule tethered to the balloon and defining a primary axis; and
a stabilizer mounted to the capsule, the stabilizer defining:
an inferior surface comprising a blunt nadir end and a truncated conical surface which is substantially radially symmetric about the primary axis; and
a plurality of apertures which extend through a thickness of the stabilizer.

2. The vehicle system of claim 1, wherein the capsule comprises a cabin which is fluidly isolated from an ambient exterior.

3. The vehicle system of claim 2, wherein a floor of the cabin is substantially orthogonal to the primary axis, wherein the balloon is tethered at an upper end of the capsule, opposite the stabilizer along the primary axis.

4. The vehicle system of claim 3, wherein a width of the capsule is larger than a maximum width of the stabilizer.

5. A vehicle system comprising:
an aerospace capsule defining a primary axis; and
a conical stabilizer mounted beneath the capsule, the conical stabilizer defining a plurality of apertures which extend through a thickness of the conical stabilizer.

6. The vehicle system of claim 5, wherein the conical stabilizer comprises a blunt nadir end along the primary axis.

7. The vehicle system of claim 5, wherein the set of apertures are substantially radially symmetric about the primary axis.

8. The vehicle system of claim 7, wherein the set of apertures comprises a plurality of meridional slots.

9. The vehicle system of claim 5, wherein the conical stabilizer comprises a composite body supported by a plurality of ribs, the ribs mounted to the aerospace capsule.

10. The vehicle system of claim 9, wherein the plurality of apertures comprises at least one aperture between each adjacent pair of ribs of the plurality of ribs.

11. The vehicle system of claim 5, wherein the conical stabilizer comprises an internal flange surrounding each aperture.

12. The vehicle system of claim 5, wherein a superior surface of the conical stabilizer defines a fluid interior between the conical stabilizer and the aerospace capsule, the plurality of apertures fluidly coupling the fluid interior to an ambient exterior.

13. The vehicle system of claim 5, wherein a lip of the conical stabilizer, distal the blunt nadir end, is offset from the aerospace capsule.

14. The vehicle system of claim 13, wherein the offset between the lip of conical stabilizer and the aerospace capsule defines at least one aperture at the lip, wherein the conical stabilizer defines a fluid manifold between the plurality of apertures through the thickness of the conical stabilizer and the at least one aperture at the lip.

15. The vehicle system of claim 5, further comprising a set of vehicle sensors extending through the blunt nadir end of the conical stabilizer.

16. The vehicle system of claim 5, wherein the plurality of apertures defines an aperture area between 2% and 10% of an area of an inferior surface area.

17. The vehicle system of claim 5, wherein a generatrix of the stabilizer is smooth and comprises at least one inflection point.

18. The vehicle system of claim 5, wherein the aerospace capsule comprises a cabin deck which is substantially orthogonal to the primary axis.

19. The vehicle system of claim 5, wherein the conical stabilizer is configured to operate as both an impact attenuator and a sea-anchor.

20. The vehicle system of claim 5, wherein the aerospace capsule and the conical stabilizer cooperatively define a draft depth, wherein the conical stabilizer is configured to attenuate water impacts by: penetrating ambient water below the draft depth; and damping oscillation about the draft depth via hydrodynamic drag.

\* \* \* \* \*